United States Patent [19]

Chesler et al.

[11] Patent Number: 4,957,344
[45] Date of Patent: Sep. 18, 1990

[54] OPTICAL FIBER TAPE ASSEMBLY AND CANISTER

[75] Inventors: Ronald B. Chesler, Woodland Hills, Calif.; George W. LeCompte, Tucson, Ariz.

[73] Assignee: Hughes Aircraft Company, Los Angeles, Calif.

[21] Appl. No.: 339,754

[22] Filed: Apr. 18, 1989

[51] Int. Cl.⁵ .................. G02B 6/44; B65H 75/20; B65H 18/28; B65H 55/04
[52] U.S. Cl. .................. 350/96.23; 350/96.24; 350/96.29; 242/118.2; 242/171; 242/173; 242/175; 242/177
[58] Field of Search .............. 350/96.22, 96.23, 96.24, 350/96.29; 242/18 G, 173, 177, 175, 171, 118.2; 156/166, 169, 171; 427/54.1

[56] References Cited

U.S. PATENT DOCUMENTS

| | | | |
|---|---|---|---|
| 4,138,193 | 2/1979 | Olszewski et al. | 350/96.23 |
| 4,496,215 | 1/1985 | Shaheen et al. | 350/96.23 |
| 4,730,894 | 3/1988 | Arroyo | 350/96.23 |
| 4,746,080 | 5/1988 | Pinson | 242/177 |
| 4,852,966 | 8/1989 | Kimmich et al. | 350/96.23 |
| 4,883,337 | 11/1989 | Dahlgren | 350/96.29 |

*Primary Examiner*—Brian Healy
*Attorney, Agent, or Firm*—R. M. Heald; R. A. Hays; W. Denson-Low

[57] ABSTRACT

An optical fiber is joined, preferably with an ultraviolet curable adhesive, to a strip of a flexible support material such as a plastic tape to form an optical fiber assembly. The assembly is wound onto a bobbin to form an optical fiber canister, which is then paid out upon demand. The optical fiber assembly requires little or no adhesive to hold it in place on the bobbin, as the support material of each turn aids in holding the adjacent turns in place, with the result that the bend radius during payout is increased.

15 Claims, 2 Drawing Sheets

OPTICAL FIBER TAPE ASSEMBLY AND CANISTER

BACKGROUND OF THE INVENTION

This invention relates to the use of optical fibers, and, more particularly, to an assembly of an optical fiber and a support material that provides improved performance in situations wherein the optical fiber is dispensed from a canister.

Optical fibers consist of strands of optically pure glass fiber processed so that light beams transmitted therethrough are subject to total internal reflection. A significant fraction of the incident intensity of light directed into the fiber is received at the other end of the fiber, even though the fiber may be hundreds or thousands of meters long. Optical fibers have shown great promise in communications applications, because a high density of information may be carried along the fiber and because the quality of the signal is less subject to external interferences of various types, as compared to electrical signals carried on metallic wires. Moreover, the glass fibers are light in weight and made from a highly plentiful substance, silicon dioxide.

Glass fibers are typically fabricated by preparing a preform of glasses of at least two different optical indices of refraction, one inside the other, or a single glass composition with a coating that ensures total internal reflection, and processing the preform to a fiber by drawing, extruding, or other method. The optical fiber is then coated with a polymer layer termed a buffer coating to protect the glass from scratching or other damage. As an example of the dimensions, in a typical configuration the diameter of the glass optical fiber is about 0.005 inches, and the diameter of the optical fiber plus the polymer buffer coating is about 0.006–0.010 inches.

For such a very fine optical fiber, the handling of the optical fiber to avoid damage or stresses that might reduce its light transmission properties becomes an important consideration. The optical fiber is typically wound onto a cylindrical or tapered cylindrical substrate, called a "bobbin", having many turns adjacent to each other in a side by side fashion to form a layer. After one layer is complete, another layer of optical fiber is laid on top of the first layer, and so on. The array of wound optical fibers is termed the "fiber pack", and the final assembly of the bobbin and the wound layers of optical fiber is termed a "canister". At a later time when the optical fiber is used, the optical fiber is ordinarily payed out from the canister in an unwinding operation, with the speed of unwinding depending upon the particular application.

It has been found by experience that, where the optical fiber is payed out from the canister in a rapid fashion, the turns of optical fiber must be held in place on the canister with an adhesive that holds the fiber pack together. The adhesive holds each turn of optical fiber in place as adjacent turns and layers are initially wound onto the canister, and also as adjacent turns and layers are payed out. Without the use of an adhesive, payout of the optical fiber may not be uniform and regular, leading to multiple dispenses (payout of two or more layers simultaneously), snags or other irregularities that damage or cause the optical fiber to break as it is payed out from the canister.

The successful dispensing or payout of the optical fiber from the canister is highly dependent upon the adhesive application and formulation. Conventional adhesives are applied to the turns of a layer after the layer is wound onto the bobbin. The deposition of the adhesive therefore requires an interruption to the winding process when each layer of optical fiber is deposited. Equally of concern, the deposition of the adhesive in precisely the correct amount is partly a handwork operation performed by a craftsman. Individual variations in application of the adhesive can lead to variations in the performance of the canister. If too little adhesive is applied in a region, multiple turns may be dispensed at once with a resulting snarl and breakage of the optical fiber. If too much adhesive is applied in a region, the stress required for payout may be too large, causing distortion or breakage of the optical fiber. If too much adhesive is applied in a region, the stress required for payout may be too large, causing distortion or breakage of the optical fiber.

The formulation of the adhesive is also a concern. Existing adhesives are neoprene based, and may become brittle at low temperatures. The brittle adhesive can cause an irregular payout because the adhesive must be fractured at the point where the dispensed portion of the fiber separates from the remaining turns.

Thus, the use of an adhesive to hold the optical fiber in place on the bobbin is a critical aspect of the optical fiber system using such a canister payout approach. There is a continuing need for improvement to this aspect of the dispensing system. The present invention fulfills this need, and further provides related advantages.

SUMMARY OF THE INVENTION

The present invention provides an optical fiber assembly and canister system having an improved approach to avoiding multiple dispenses of fiber turns that can lead to snarls and breakage of the optical fiber in use. The dependence upon the nature of the adhesive and its application is eliminated, and the necessity of interruptions to the winding process is avoided. The bending stresses applied to the optical fiber during payout are reduced, as its radius of curvature is increased, resulting in less likelihood of breaking during payout. Finally, performance of the optical fiber in free-falling, post-dispense applications is enhanced.

In accordance with the invention, an optical fiber assembly comprises a strip of a flexible support material having a flat face thereon; and an optical fiber joined to the strip of flexible support material along the flat face thereof. This optical fiber assembly is utilized by winding it onto a bobbin to form a canister. Thus, an optical fiber canister comprises a bobbin; and a plurality of turns of an optical fiber assembly wound onto the bobbin in a side-by-side manner, the assembly including a strip of a flexible support material, and an optical fiber joined to the strip of flexible support material.

The optical fiber assembly preferably includes a conventional optical fiber having a glass core inside a glass casing of slightly lower refractive index, and a buffer coating over the glass casing to protect it. The strip of support material is an elongated flexible piece extending the length of the optical fiber assembly. The support material is preferably a plastic tape. The optical fiber is joined to the strip of flexible material using a suitable adhesive, preferably an ultraviolet curable adhesive.

The optical fiber assembly is wound onto the bobbin in the conventional layered manner, with each layer formed from a plurality of side-by-side turns of the optical fiber assembly. No adhesive is required to hold the turns in place, as the support material for each turn is positioned to contact the adjacent turn and hold it in place. Some small amount of adhesive may be required, particularly to hold the ends of each layer in the step back region where the next layer is begun.

The present invention provides an important advance in the art of optical fibers, particularly as used in applications where the fiber is wound onto and stored upon a bobbin after production but before use. Other features and advantages of the invention will be apparent from the following more detailed description of the invention, taken in conjunction with the accompanying drawings, which illustrate, by way of example, the principles of the invention.

DETAILED DESCRIPTION OF THE INVENTION

In accordance with the invention, an optical fiber assembly comprises a strip of a flexible support material having a flat face thereon; and an optical fiber joined to the strip of flexible support material along the flat face thereof.

Figure 1:
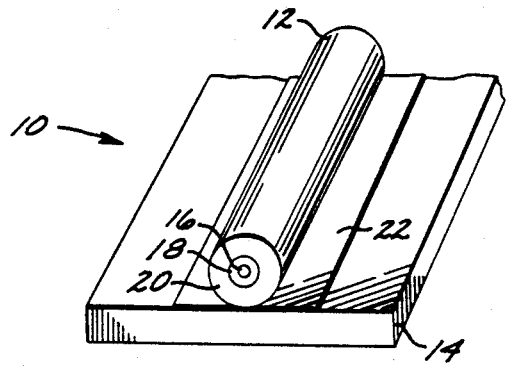
FIG. 1 is a perspective view of an optical fiber assembly, with an optical fiber joined to a support.

FIG. 1 depicts an optical fiber assembly 10 having an optical fiber 12 joined to a flexible strip 14 of a support material. The optical fiber 12 includes a core 16 and a cladding 18, each formed of a different type of glass. The glass of the cladding 18 has a slightly lower refractive index than the glass of the core 16. Around the cladding 18 is a buffer coating 20 of a polymer material such as epoxy acrylate. The preparation of such optical fibers 12 is known in the art, and is not part of the present invention.

The support material forming the strip 14 is preferably a tape of a plastic material such as the poly(ethylene terephthalate) available commercially in thin sheets or tapes as MYLAR. The optical fiber 12 is joined to the strip 14 by any suitable means, preferably an adhesive layer 22. The adhesive is preferably an ultraviolet light curable adhesive such as epoxy acrylate. It is deposited upon one surface of the strip 14, either on the entire surface or the central portion thereof as depicted in FIG. 1. The optical fiber 12 is contacted to the adhesive layer 22 with the adhesive in an uncured state, and while in contact the adhesive is cured by exposure to ultraviolet light.

A specific example is provided to illustrate the approach of the invention, without limiting the invention in any respect. A commercially available glass optical fiber 12 has an outer diameter of about 0.006–0.010 inches, typically 0.008 inches, and is provided in a continuous form on a spool. A strip 14 of mylar plastic tape is about 0.0005 inches thick and about 0.016–0.024 inches wide, and is provided in a continuous form on a spool. The width of the strip 14 is preferably at least two times the diameter of the optical fiber 12, and most preferably about three times the diameter of the optical fiber 12. Epoxy acrylate adhesive about 0.0005 inches thick is coated onto the central region of one of the flat faces of the strip 14, in a layer 22 that is about 0.010 inches wide and continuous along the length of the strip 14. While the adhesive is in an uncured state, the optical fiber 12 is contacted to the central portion of the adhesive layer 22, and the adhesive is immediately cured by exposure to an ultraviolet light source that produces a sufficient intensity of light in the 300–350 nanometer range to cure the adhesive. Such curing typically requires only about 1 second, and the bonding of the optical fiber to the strip is complete.

This joining operation is conducted in a progressive, continuous manner with the strip continuously unwound from its spool and coated with adhesive, the optical fiber unwound from its spool and contacted to the coated strip, and the uncured assembly passed under ultraviolet lamps. The cured assembly 10 is then wound onto a takeup spool, or directly onto a bobbin. The practice of the invention is not limited to any particular optical fiber, plastic strip material, adhesive material, or dimensions, but the above approach is preferred.

Figure 2:
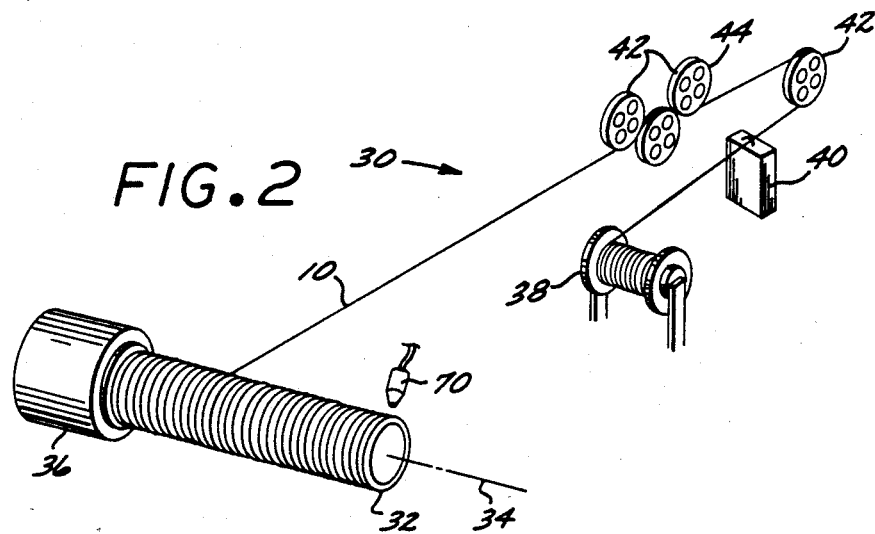
FIG. 2 is a schematic perspective view of an apparatus for winding an optical fiber onto a bobbin to form a canister, using the approach of the invention.

Either immediately after curing or at a later time, the optical fiber assembly 10 is wound onto a bobbin. A winding apparatus 30 for winding the optical fiber assembly 10 onto a bobbin 32 is illustrated in FIG. 2. The bobbin 32 may be cylindrical, or may be a tapered cylinder that is tapered slightly from one end to the other, as by about 2 degrees of taper, with the bobbin 32 in either case having an axis 34 of the cylinder. The bobbin 32 is typically made of aluminum, with a winding of steel wire wound overlying the aluminum to act as a guide for the laying down of the optical fiber assembly 10.

The bobbin 32 is mounted on a winding lathe 36 that rotates the bobbin 32 about the axis 34 in a controllable manner. Additionally, the winding lathe 36 translates the bobbin 32 in the direction parallel to the axis 34, so that the optical fiber 10 may move along a constant line of travel as it is wound onto the bobbin 32. The lathe 36 is geared so that the advance in each direction matches the turning rate, to permit the optical fiber assembly 10 to deposit uniformly, first upon the steel wire and thereafter upon the preceding layers of optical fiber assembly.

The optical fiber assembly 10 is initially supplied from a storage spool 38. As the optical fiber assembly 10 is unwound from the spool 38, it passes through a guide 40 and thence over a set of rollers 42. The rollers 42 align the fiber 10. Additionally, at least one of the rollers 42 is a tensioning roller 44, which is spring loaded. The tensioning roller 44 cooperates with the lathe 36 to apply a proper tension to the optical fiber assembly 10 as it is wound onto the bobbin 32.

Figure 3:
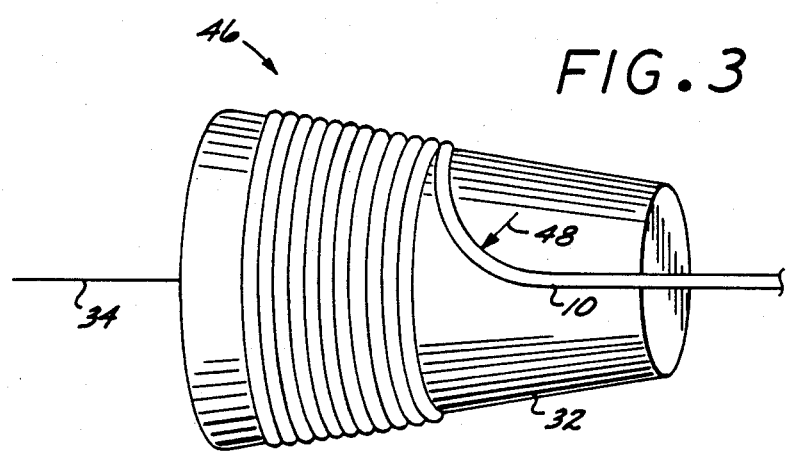
FIG. 3 is an enlarged perspective view of a partially unwound canister.

The finished bobbin 32 with the optical fiber assembly 10 thereupon is termed a canister 46, which is then retained in storage prior to the required use of the optical fiber, and the wound optical fiber assembly on the bobbin 32 is termed a fiber pack. During use, the optical fiber assembly 10 is unwound from the bobbin 32 and removed from the canister in an operation termed payout or dispensing. A typical payout approach is illustrated in FIG. 3, wherein the optical fiber assembly 10 is removed generally parallel to the cylindrical axis 34 of the bobbin 32, one turn of optical fiber assembly 10 at a time. As the optical fiber assembly 10 is payed out, it assumes a radius of curvature 48, which preferably is not less than about forty times the radius of the optical fiber 12. This bend radius corresponds to a bending stress of about 250,000 pounds per square inch at the surface of the optical fiber 12. Very small radii of curvature during payout can break the optical fiber. In the prior approach using an adhesive between each turn of the optical fiber 12, the release force during payout was large, resulting in a rather small radius of curvature 48. In the present approach using the optical fiber assembly of the invention, the release force is reduced, also reducing the radius of curvature 48 and bend stress on the fiber, thereby reducing the likelihood of damage of the optical fiber 12 by the forces of payout.

Figure 4:
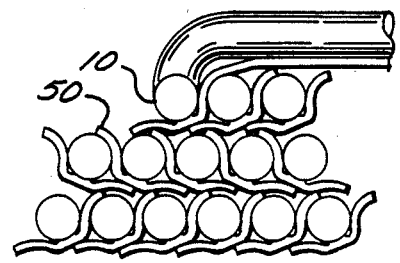
FIG. 4 is a diagrammatic view through a fiber pack, illustrating the payout of a layer of the optical fiber in the "hard" direction.
Figure 5:
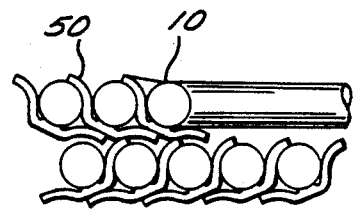
FIG. 5 is a diagrammatic view through the fiber pack of FIG. 4 at a later stage of payout, wherein the top layer has been unwound, and payout of the next layer in the "easy" direction is underway.

FIGS. 4 and 5 illustrate the arrangement of the optical fiber assembly 10 on the bobbin 32 as part of the fiber pack, during payout. In each case, the optical fiber assembly 10 is paid out to the right. In winding operations, one layer is wound left-to-right, the overlying layer is wound right-to-left, and this sequence repeats. This winding approach leads to a "hard" unwind orientation for the optical fiber assembly of the present invention, as seen in FIG. 4, and an "easy" unwind orientation, as seen in FIG. 5. The "easy" unwinding orientation corresponds to a relatively larger radius of curvature 48, and the "hard" unwinding orientation corresponds to a relatively smaller radius of curvature 48. In both cases the radius of curvature 48 is greater than that experienced when an adhesive is used between the turns of the optical fiber having no strip support like that of the present invention, reducing the likelihood of failure of the optical fiber 12 due to excessively high bend stresses.

Examining the fiber pack of FIGS. 4 and 5 in more detail, the optical fibers 12 of any layer are in a generally side-by-side arrangement on the bobbin 32, but are separated by an upstanding portion 50 of the strip 14. The upstanding portion 50 slightly overlies the adjacent turn of the assembly 10, holding it in place on the bobbin 32. Since the assembly 10 is wound onto the bobbin 32 under tension, the overlying portion of the strip 14 serves to hold the adjacent turn in place. The next overlying layer also aids in this function, so that the multiple layers are held firmly but releasably in place upon the bobbin 32. It has been found that if the width of the strip 14 is less than about twice the diameter of the optical fiber 12, there is an insufficient length of the upstanding portion 50 to function in the indicated manner, and a ratio of strip width to diameter of about 3 provides the best performance. If the width is more than about three times the diameter of the optical fiber 12, then there is an interference with the smooth payout operation. The width of the strip 14 is therefore preferably from about two to about three times the diameter of the optical fiber 12.

In the "easy" unwind orientation, FIG. 5, the optical fiber assembly is wound onto the bobbin 32 such that the upstanding portion 50 presses against the next turn of the optical fiber assembly 10 to be unwound. During unwinding, there is no pressure tending to prevent free release of each turn of the assembly 10, with the result that there is a very low releasing force and large radius of curvature 48. In the "hard" unwind orientation, FIG. 4, each upstanding portion 50 presses against the turn that precedes it in being unwound. During unwinding, there is a small pressure of the upstanding portion 50 from the next turn that tends to prevent free payout. The result is a larger release force and smaller radius of curvature 48.

The approach of the invention avoids the need for the use of adhesive in most situations, such as the great majority of each layer of optical fiber assembly. However, adhesive may be used in some particular limited portions of the fiber pack. One such portion is the top layer of the fiber pack, where there is no overlying layer to aid in holding the top layer in place.

Figure 6:
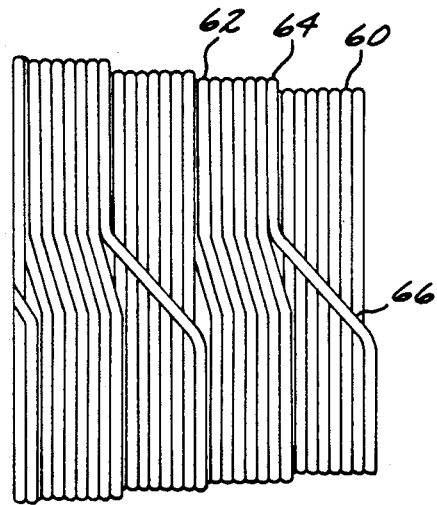
FIG. 6 is an elevational view of a detail of the canister of FIG. 1, illustrating a stable step back between layers.

Another place where adhesive may be used in limited amounts is at the end of each layer. A "step back" approach is used at the end of each layer, as illustrated in FIG. 6. At the completion of winding each layer, the direction of movement of the bobbin 32 along the direction parallel to the cylindrical axis 34 is reversed, so that the next layer of optical fiber assembly 10 can be deposited overlying the previously deposited layer. In the drawing, a first layer 60 is wound from left to right. At the completion of the first layer 60, the second layer 62 is wound from right to left overlying the first layer 60. The rightmost turn 64 of the second layer 62 does not commence exactly at the rightmost end of the first layer 60, but instead is stepped back by several turns. Such a step back approach in winding reduces the likelihood of snarls developing when the optical fiber assembly 10 is later unwound from the bobbin 32. The optical fiber assembly 10 therefore must execute a transition 66 from the rightmost end of the first layer 60 to the rightmost turn 64 of the second layer 62. In some circumstances, the transition 66 may not be possible without the use of a small amount of adhesive applied directly to the turns of the optical fiber assembly 10.

Wherever extra adhesive is required, it may be applied to the optical fiber assembly 10 as it is being wound onto the bobbin 32 in the apparatus of FIG. 2. An adhesive spray head 70 is supported above the bobbin 32 so that adhesive may be sprayed directly onto the assembly 10 at selected locations as may be desired, such as during winding of the top layer and at end transitions. Because of the step back transition design, it is possible to apply the adhesive after the entire fiber pack has been wound, reducing interruptions to the winding operation.

After unwinding, the optical fiber assembly approach of the invention may yield additional benefits, depending upon the specific application. The strip 14 may be made of a strong but flexible material, so that it imparts strength to the assembly 10. The added strength permits the use of a larger unwinding force than would otherwise be possible.

Also, in some applications, the optical fiber is used in a "free-fall" application, where it is pulled out of the canister and permitted to fall in a transverse direction (i.e., perpendicular to the axis of the fiber) freely through the air, except for being constrained at the ends where the light signal is sent and received. In this case and other applications where the optical fiber falls or is dragged through the air transversely, the strip 14 fixed to the glass fiber 12 has a high transverse coefficient of drag that resists the movement of the optical fiber through the air and slows it down, acting much like a parachute. The slower rate of travel of the fiber through the air permits it to remain in the air for a greater time, or, alternatively stated, to have a greater "float". This increased time in the air and decreased rate of transverse movement gives greater flexibility of use for many applications. The improved geometry of the payed out optical fiber assembly, as compared with a conventional optical fiber, is an important advantage, particularly in those applications where long lengths of optical fiber or curved trajectories of the fiber are required.

The present invention therefore provides improved performance of optical fibers both before and after pay out from a canister, and improves the efficiency of the canister winding operation. Elimination of adhesive for most of the fiber pack permits the optical fiber assembly to be unwound during the winding operation if a winding error is discovered. Although a particular embodiment of the invention has been described in detail for purposes of illustration, various modifications may be made without departing from the spirit and scope of the invention. Accordingly, the invention is not to be limited except as by the appended claims.

What is claimed is:

1. An improved optical fiber assembly for selectively winding, storing and unwinding an optical fiber, comprising:
   an optical fiber windable into a plurality of side-by-side turns; and
   flexible support means joined to said optical fiber and extendable between side-by-side turns for contacting and maintaining said turns in side-by-side relationship during storage and unwinding of said optical fiber.

2. An optical fiber assembly according to claim 1, wherein said optical fiber includes a single, elongated strand of optical fiber forming a cable capable of transmitting optical signals.

3. An optical fiber assembly according to claim 1, wherein said flexible support means comprises a strip of flexible support material having a flat face joined to said optical fiber.

4. The optical fiber assembly of claim 3, wherein the support material is a plastic tape.

5. The optical fiber assembly of claim 4, wherein the tape is made of MYLAR.

6. The optical fiber assembly of claim 3, wherein the strip of the support material is about 0.0005 inches thick and from about 0.010 to about 0.020 inches wide.

7. The optical fiber assembly of claim 3, wherein the optical fiber is joined to the strip of flexible material by an ultraviolet-light curable adhesive.

8. The optical fiber assembly of claim 1, wherein the optical fiber comprises:
   a glass fiber having a core of a first type of glass: a cladding formed of a second type of glass enclosing said core, and a buffer coating overlying the cladding.

9. The optical fiber assembly of claim 1, wherein the optical fiber has a diameter of from about 0.008 to about 0.020 inches.

10. The optical fiber assembly of claim 3, wherein the width of the strip of support material is at least about twice the diameter of the optical fiber.

11. An optical fiber assembly, comprising:
    a strip of a flexible support material;
    an optical fiber joined to the strip of flexible support material;
    said strip of flexible support matter having a width no greater than about three times a diameter of the optical fiber.

12. An optical fiber canister, comprising:
    a bobbin;
    a plurality of turns of an optical fiber assembly wound onto the bobbin in a side-by-side manner, the assembly including
    a strip of a flexible support material, and
    an optical fiber joined to the strip of flexible support material;
    said strip of flexible support material extending between and contacting adjacent turns of optical fiber to maintain said turns in side-by-side relationship.

13. The canister of claim 12, wherein the bobbin is a tapered cylinder.

14. An optical fiber assembly according to claim 3, wherein said strip of flexible support material has a width no greater than about three times the diameter of said optical fiber.

15. An optical fiber assembly according to claim 11, wherein the width of said strip of flexible support member is at least about twice the diameter of said optical fiber.

* * * * *